Nov. 5, 1963  A. McPHERSON  3,109,530
MEANS FOR ORIENTING VALVE BASES AND SIMILAR COMPONENTS
Filed Nov. 28, 1960  2 Sheets-Sheet 1

United States Patent Office 3,109,530
Patented Nov. 5, 1963

3,109,530
MEANS FOR ORIENTING VALVE BASES AND SIMILAR COMPONENTS
Alexander McPherson, Fulwell, Sunderland, England, assignor to Associated Electrical Industries Limited, London, England, a British company
Filed Nov. 28, 1960, Ser. No. 72,166
Claims priority, application Great Britain Nov. 2, 1959
6 Claims. (Cl. 198—33)

The invention relates to improvements in means of orienting electronic valve bases and similar components. The expression similar components is intended to mean components having a body of circular or annular shape and having pins or other parts projecting parallel to the main axis and arranged on a circle or circular arc substantially concentric with the main axis of the body.

In machines designed to handle valve bases, valves or other components with pin base connections arranged on a circle about the valve base axis, it is often desirable that the valve base should be given a particular orientation about the axis round which the pins are disposed before being passed to a given working position.

An object of the present invention is to provide a simple device for orienting a valve base into a given position with respect to its axis.

According to the present invention a device for feeding and orienting electronic valve bases and similar components comprises means for supporting and guiding the component for movement in a plane normal to its main axis including at least one pair of parallel spaced guides, one of said guides having serrations, whose pitch is related to the pin spacing of the component, so that the component when subject to a force parallel to the guides progresses between the guides in cycloidal motion by engagement of the pins with the notches between adjacent teeth of the serrations.

A convenient and usual arrangement of the device according to the invention will be that in which the component is caused to move in a substantially horizontal or slightly inclined plane between the pair of parallel spaced guides whilst keeping its main axis substantially vertical, the guides and the plane of the serrations being in substantially horizontal planes.

Accordingly, a device for feeding and orienting valve bases and similar components comprises a trough shaped member serving to support and guide the components and along which the components are to be moved with their planes substantially parallel to the base of the trough, the trough having a serrated edge or a serrated strip in or along one side thereof for engagement by the pins to cause the components to progress along the trough by cycloidal motion.

Where the pins of the component have unequal or irregular spacing in a circle or arc, substantially concentric with the axis, this formation of the pins is made use of for orienting the components during their passage along the trough. For example, in the case of the well known pin formation for bases for electronic valves where in a total of $n$ pins $n-1$ angular spaces are equal and only one space is unequal, the device according to the invention includes a member displaceable by the component for each equal angular step taken by the component along the trough corresponding to the pitch of the teeth of the serrated edge, but immovable when the angular distance between two pins differs from the said pitch of the teeth.

The displaceable member may comprise a mask covering a suitable number of serrations and arranged to be displaceable against light spring pressure laterally with respect to the length of the trough, this lateral displacement being caused by successive valve pins when the latter are brought opposite to and enter the notches between two adjacent teeth in the serrated part of the trough as the component performs its cycloidal motion. Such lateral displacement occurs for each of a succession of equally spaced pins but fails to take place when the spacing between two successive pins does not correspond with the pitch of the teeth. When, as in the case of a standard valve base, the linear spacing of two of the pins is greater than the linear spacing of the remaining pins but not an exact multiple thereof, the second of the two pins cannot enter a notch and so the mask cannot be laterally displaced and the cycloidal motion of the component is arrested. The width of the trough being suitably chosen, the component can then only proceed further along the trough by purely translatory motion and so is delivered from the discharge end of the trough with the pins remaining in the same position as that obtained when the cycloidal motion was arrested.

In order to obtain the same orientation of a supply of components fed in random manner to the receiving end of the trough and having $n$ pins separated by $n-1$ equal spaces and one unequal space, the movable mask is arranged to cover a total of $n$ successive notches in the serrated portion of the trough.

An example of a device according to the invention will now be more precisely described with reference to the accompanying diagrammatic drawings, in which.

Figures 1, 2:
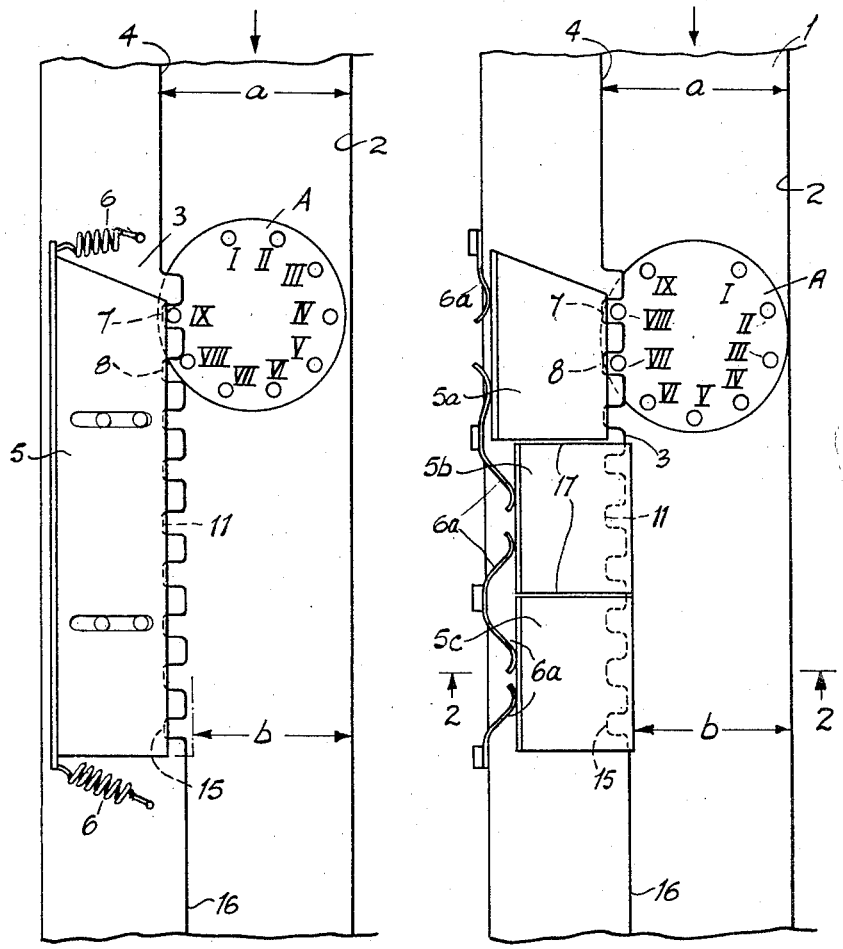
FIG. 1 shows a plan view of one embodiment with a component, such as a valve base, at the beginning of its travel along that section of the serrated trough covered by the mask.
FIG. 2 shows a similar view of a modification.
Figures 3, 4:
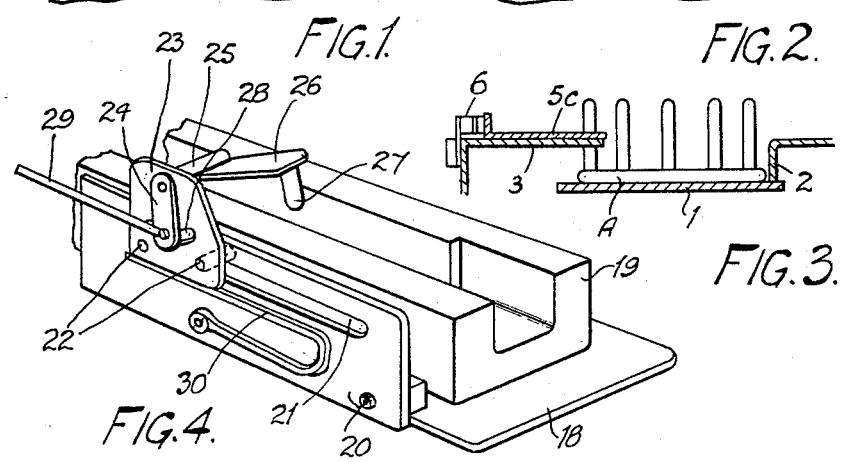
FIG. 3 shows a cross-section of the arrangement of FIG. 2.
FIG. 4 is a perspective view showing in simplified form one type of feeding device which may be used in combination with the device shown in FIGS. 1, 2 and 3.

Referring now to FIGS. 1, 2 and 3 of the drawings, the orienting device consists essentially of a horizontal trough shaped member having a smooth floor 1, one smooth wall or shoulder 2 and a serrated wall or shoulder 3. In FIG. 1, valve bases A of the B-9-G type, are fed onto the floor 1 and moved in the direction of the arrow by some suitable means such as a blast of compressed air or a moving belt (not shown), running along the floor 1. The trough may be inclined in the direction of the arrow to assist the movement of the bases. After travelling along a smooth section of the trough 4 whose width $a$ just gives a free clearance, the valve bases reach the serrated section 3 of the left hand wall, when the pins engage the notches of the serrations and the bases begin to rotate in a clockwise direction as they move along the trough in cycloidal fashion. Eventually the bases reach the mask 5 in the form of a blade which is parallel guided and lightly held in the position shown by springs 6 at either end. The bases continue to turn, the pins displacing the blades during engagement of each pin.

It will be seen that, since the angular spacing of pins I and IX is exactly double that of any other two pins, the linear spacing, or pitch, between pins I and IX is less than double the linear spacing of the other pins, which is equal to the linear spacing or pitch of the serrations, and so pins I and IX cannot both engage the serrations at any one time. Eventually the valve base reaches a position in which neither of pins I and IX are in engagement with the serrations but both are in contact with the continuous edge of the blade 5. The distance $b$ from the edge of the blade to the wall 2 is approximately equal to or slightly greater than the sum of the radius of the base and the distance between the straight line joining pins I and IX and the base centre, so that once the base is turned into the position with pins I and IX in contact with the blade edge it will continue to move along the trough without further rotation. The width of the trough at the discharge end is made sufficiently small to prevent the bases from turning when they leave the blade 5 after having been properly oriented.

For a nine pin base the blade 5 covers nine notches of the serrations. This is necessary since the pins may engage the beginning of the serrations in a random manner. The drawing shows the limiting case when pin IX engages the first notch 7 under the blade. Pin I will in due course engage the last notch 15 and the base will then move into the discharge end of the trough with pins I and IX in contact with the left hand wall 16.

Figures 5, 6:
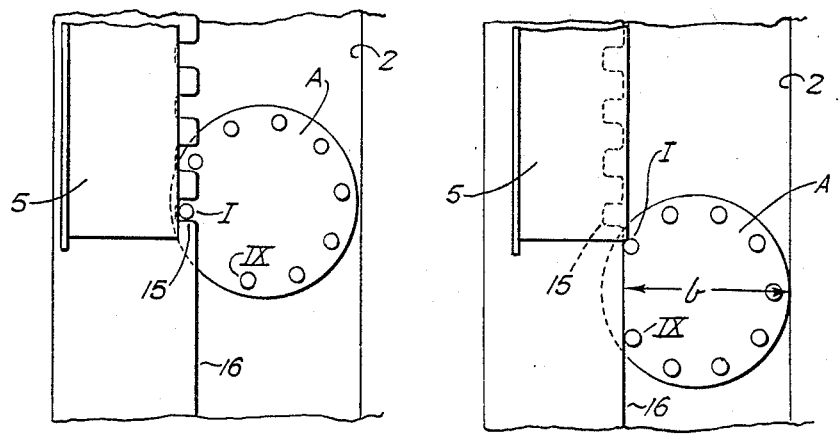
FIG. 5 and FIG. 6 are diagrams illustrating the progress of a component along the serrated member of FIG. 1 into its finally oriented position.

The last portion of the cycloidal motion is shown in FIGS. 5 and 6. FIG. 5 shows the position of the component A when the pin I is fully engaged in the notch 15. Continued movement of the component releases pin I from the last notch and the component reaches the desired orientation shown in FIG. 6, wherein the first and last pins I and IX are in line against the plane edge of the guide 16. Since the spacing $b$ between the edge of the guide member 16 and the guiding surface 2 is substantially equal to the distance between the common base line of pins I and IX and the opposite edge of the component, the latter can now only progress along the trough by translatory movement in the position shown in FIG. 6.

In all other cases the component will be correctly oriented before reaching the last notch 15. In the case where the components enter the receiving end of the trough at such a rate that one or more components come into the masked section of the serrations before other components have passed out, there may be jamming. For example, with a single mask as shown, the case could arise in which there would be one valve base at the centre of the mask with one of its pins engaging the centre notch 11 under the mask and one valve base entering and one leaving the trough section covered by the mask. The centre base would depress the mask so as to uncover all of the notches and if the valve base just entering the trough were to be properly oriented with pin IX opposite the first notch 7 there would be the risk of the base turning slightly backwards so as to allow pin IX to enter the second notch 8 after which the base would again proceed to rotate during its travel down the trough. The base would then reach the end of the trough with pin II engaging the last notch 15 and would be unable to turn further and would jam.

To avoid this, and other errors due to the use of a single mask, the mask may be divided into individually sprung sections 5a, 5b and 5c as shown in FIGS. 2 and 3, the springs 6 being here shown as leaf springs.

Alternatively, the blade could be subdivided in other ways, for example into two unequal and individually sprung sections separated at either one of the positions 17.

The valve bases may be made to travel along the trough with the pins pointing upwards, in which case the moulded part of the valve base may rest on the edges of a slot (not shown) formed in the floor 1 with any wires or other connections to the pins hanging downwards. Alternatively, it may be arranged for the valve bases to travel along the trough with the pins resting on the floor 1.

Various devices may be used for feeding or propelling the circular components along the trough, for example a reciprocating claw, connected by means of a linkage to a fluid-pressure operated piston, may be arranged to engage the components and draw them along the trough.

An example of such a feed device is illustrated in perspective in FIG. 4.

18 is a fixed base plate, upon which is mounted the trough 19, the entry end of which is seen in the figure, but which may otherwise be equivalent to the trough shown in FIGS. 1 and 2, the serrations and the masks being omitted to simplify the drawing.

The feed device is also mounted on the base plate 18, and comprises a plate 20, slotted at 21 to form a guide for a pin 22 carried by a bracket 23. The bracket carries a pivoted crank arm 24 whose pivot pin is extended across the channel of the trough to form a carrier 25 for a lever 26 carrying a pin 27.

The crank 24 is oscillated through an angle defined by a slot 28 in the bracket 23 by means of a connecting rod 29 and pneumatic piston and cylinder (not shown).

A friction braking effect on the sliding bracket 23 is provided by a spring 30, which presses upwardly against the underside of the bracket 23, so that in order to move the bracket the retarding effect of the friction between the spring 30 and the bracket must first be overcome. Thus when the rod 29 moves to the right, the lower part of the crank 24 moves to the limit of its travel in the arcuate slot 28 before the bracket 23 begins to move. In this way, the lever 26 is first lifted out of the trough before moving along to the right and, in a similar manner, on the return stroke, lever 26 is first lowered into the trough before the bracket 23 moves backwards (to the left).

The pin 27 is shaped to engage loosely in a centre hole in the valve base, or other component (not shown) to draw the same along the trough in the direction of the arrow. Where the component is differently shaped, or has not central hole, the pin may be modified in shape or may be replaced by a suitably shaped claw or by one or more fingers. It will be understood that the device of FIG. 4 above described is employed to feed the components into an entry section of the orienting means such as the section 2 shown at the top of FIG. 2. Thus, since the device of FIG. 4 will be located adjacent the top end of entry section 2, or made as a removable extension thereof, the serrated masks of FIG. 2 will remain in a position equivalent that shown in FIG. 2 and are therefore not shown in FIG. 4.

In the construction of the feeding and orienting device above described, the edge of the valve base A is guided at the right-hand side by a smooth guide surface 2, which may be the trough wall, running parallel to the serrated guide member 16.

Figure 7:
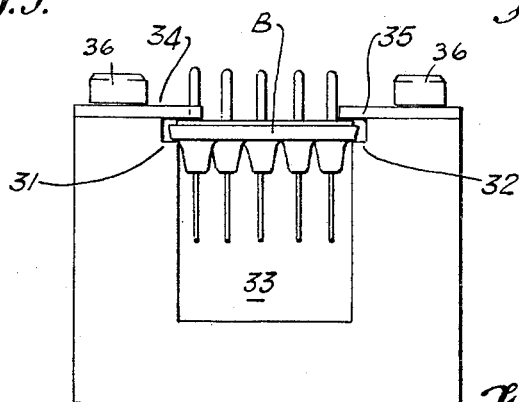
FIG. 7 is an end view of a cross-section through a further form of the device according to the invention.
Figure 8:
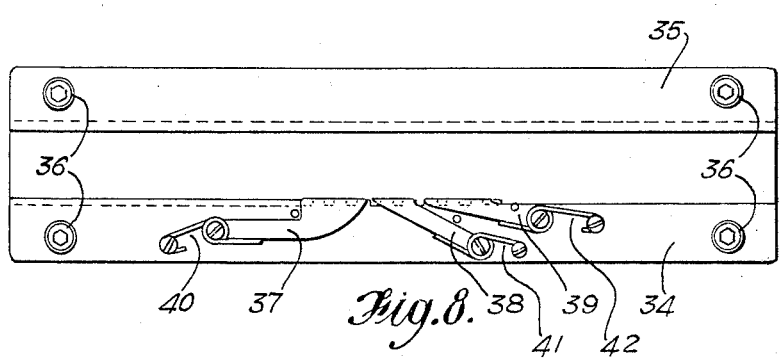
FIG. 8 is a plan view of the device shown in FIG. 7.

FIGS. 7 and 8 illustrate a form of device, wherein the right-hand guide member is arranged to guide the pins of the valve base instead of the annular edge thereof, and in this construction the valve base is shown with the disc-like body portion B resting upon steps 31 and 32 at each side of the trough 33. Both the serrated guide member 34 at the left-hand side of the trough and the continuous guide member 35 at the right-hand side thereof are in the form of strips removably secured to the top trough by screws 36.

The masking positions 5a, 6b and 5c of FIG. 2 are replaced in this construction by three plate-like pawls 37, 38 and 39 biased into the masking position by torsion springs 40, 41 and 42.

The apparatus shown in FIGS. 7 and 8 is equivalent in function to that described with reference to FIGS. 2, 3, 5 and 6. To avoid complication of the drawing the valve base is not shown in FIG. 8, the modified valve base with the pins extending downwardly is shown in the enlarged end view in FIG. 7. Comparing FIG. 8 with FIG. 2, the former shows the part of the track along which the valve bases move, the direction of movement being from left to right corresponding to downward movement in FIG. 2. The masking sections 5a, 5b and 5c of FIG. 2 are replaced by the spring-loaded masks 37, 38 and 39, where the springs are of spiral form and the masks are of lever shape, all of which, however, have equivalent functions to the masks and leaf springs 6a of FIG. 2.

What I claim is:

1. A device for feeding and orienting electronic valve bases and similar components having a number of pins distributed around a disc-like base on a circle concentric with the axis of the component and extending perpendicular to the plane of the said base comprising means for supporting and guiding the components for movement in a plane normal to their main axes including parallel extending guiding surfaces along which said components may freely slide, said guiding surfaces forming an entry section leading to an orienting section having a uniformly serrated guiding surface along one side thereof, said components entering the orienting section in random manner as regards the position of the pins, the pitch of the teeth of said serrated surface being related to the pin spacing of the component, so that the component when subject to a force parallel to the guides progresses between the guides by engagement of the pins with the notches between adjacent teeth of the serrations said device being adapted to orient components having, in at least one position on the pitch circle of the pins, a larger spacing between two adjacent pins than between other pins, and said serrated guiding surface having at least one movable mask arranged to cover a series of said teeth and to be laterally displaceable against spring force by the pins to allow the pins to engage in succession between the teeth as the component performs the said progressing motion, the transverse spacing between the mask edge when in the forward position and the opposite parallel guiding surface being less than the maximum effective width of the component but sufficient to allow sliding clearance of the component when the pins having the maximum mutual spacing lie in contact with the mask edge whereby the components pass through in that position.

2. A device according to claim 1, adapted to orient components having a total of $n-1$ equally spaced pins out of a total of $n$ possible positions equally spaced concentrically about the axis of the component, and wherein the mask covers a total of $n-1$ notches of the serrations.

3. A device according to claim 2, wherein the mask is divided into a plurality of independently sprung sections, the total number of notches in the serrations which can be simultaneously masked by all of the said sections being equal to the number of pins carried by the component.

4. A device according to claim 2, wherein the discharge end of the device is unserrated and the effective guiding width for the components is approximately equal to the distance between the edge of the mask, when not displaced against the spring force, and the opposite parallel guide.

5. A device according to claim 2, wherein the components are supported above the base of the channel or the base of the channel is centrally open to allow any lead wires or other connecting devices carried by the components to pass therethrough whilst the component is moving therealong.

6. A device according to claim 1, adapted to orient components having a total of $n-a$ equally spaced pins out of a total of $n$ equally spaced positions concentric with the component axis and wherein the mask is adapted to cover $n-a$ notches of the serrations.

References Cited in the file of this patent

UNITED STATES PATENTS 2,830,462    Vettese _____ Apr. 15, 1958

OTHER REFERENCES

IBM Technical Disclosure Bulletin; vol. 1, No. 6, 1 page, April 1959.